(12) United States Patent
Futamura et al.

(10) Patent No.: US 8,180,543 B2
(45) Date of Patent: May 15, 2012

(54) MOVEMENT STABILIZING APPARATUS FOR COMBINATION VEHICLE

(75) Inventors: Tomoyuki Futamura, Wako (JP); Takeshi Kojima, Wako (JP); Kazuaki Miyata, Tomi (JP)

(73) Assignees: Honda Motor Co., Ltd., Tokyo (JP); Nissin Kogyo Co., Ltd., Ueda-shi (JP)

( * ) Notice: Subject to any disclaimer, the term of this patent is extended or adjusted under 35 U.S.C. 154(b) by 936 days.

(21) Appl. No.: 12/163,182

(22) Filed: Jun. 27, 2008

(65) Prior Publication Data

US 2009/0005946 A1 Jan. 1, 2009

(30) Foreign Application Priority Data

Jun. 29, 2007 (JP) .................................. 2007-172848

(51) Int. Cl.
*G06F 7/70* (2006.01)

(52) U.S. Cl. ................ 701/70; 701/71; 701/82; 701/69; 303/123; 180/14.1; 180/14.6

(58) Field of Classification Search .................... 701/69, 701/70, 71, 82, 83, 84; 303/123, 146, 7; 280/400; 180/14.1, 14.6
See application file for complete search history.

(56) References Cited

U.S. PATENT DOCUMENTS

| | | | |
|---|---|---|---|
| 6,523,911 B1 | 2/2003 | Rupp et al. | |
| 6,600,974 B1 * | 7/2003 | Traechtler | 701/1 |
| 7,272,481 B2 * | 9/2007 | Einig et al. | 701/70 |
| 7,917,274 B2 * | 3/2011 | Hackney et al. | 701/82 |
| 2003/0062768 A1 * | 4/2003 | Loudon et al. | 303/146 |
| 2006/0125313 A1 * | 6/2006 | Gunne et al. | 303/7 |
| 2006/0155457 A1 | 7/2006 | Waldbauer et al. | |
| 2006/0187008 A1 * | 8/2006 | Yu | 340/431 |
| 2006/0204347 A1 | 9/2006 | Waldbauer et al. | |
| 2008/0172163 A1 * | 7/2008 | Englert et al. | 701/83 |

FOREIGN PATENT DOCUMENTS

| | | |
|---|---|---|
| DE | 100 32 230 | 1/2002 |
| DE | 100 48 418 | 4/2002 |
| JP | 2003-503276 | 1/2003 |
| JP | 2006-505442 | 2/2006 |
| WO | 2004/048171 | 6/2004 |

* cited by examiner

*Primary Examiner* — John Nguyen
*Assistant Examiner* — Brian J Broadhead
(74) *Attorney, Agent, or Firm* — Rankin, Hill & Clark LLP (57) ABSTRACT

A movement stabilizing control ECU 25 includes a differential unit 25a, a cycle calculation unit 25b, a time constant/gain setting portion 25c, a first-order lag processing unit 25d, a pendulum movement detection unit 25e, a control amount calculation portion 25f and a control amount output unit 25g. The time constant/gain setting portion 25c sets a time constant $\tau$ and a gain K used at the time of subjecting a yaw acceleration $\omega'$ which is a time-differential value of a yaw rate $\omega$ to the first-order lag processing at the first-order lag processing unit 25d, with reference to a function or data of a look-up table, for example, depending on the cycle or the frequency of the yaw acceleration $\omega'$ due to the pendulum movement. The control amount calculation portion 25f multiplies the amplitude of a yaw acceleration $\omega_d'$ outputted from the first-order lag processing unit 25d by a predetermined constant to calculate a yaw control amount with a phase in opposite to that of the yaw acceleration $\omega_d'$ and outputs the yaw control amount to the control amount output unit 25g.

3 Claims, 5 Drawing Sheets

MOVEMENT STABILIZING APPARATUS FOR COMBINATION VEHICLE

BACKGROUND OF THE INVENTION

1. Field of the Invention

The present invention relates to a vehicle for towing a trailer and particularly relates to a movement stabilizing apparatus for a passenger car.

2. Description of Related Art

In automobiles (vehicles) towing trailers, a combination vehicle of tractor/trailer may begin to roll due to excessive speed, bad road conditions, crosswinds or the like. Such a problem arises particularly in towing trailers which do not have their own actuators and sensors for stabilizing the traveling dynamics. In particular, for trailers which have almost the same weights as passenger cars serving as tractors, the problem occurs. Thus, stability problems occur in the passenger cars which are towing travel trailers, for example.

If a snake movement or a pendulum movement occurs in a combination vehicle composed of an automobile (vehicle) and a trailer, the trailer oscillates about its vertical axis and also oscillates the passenger car serving as tractor via a trailer hitch. If the vehicular speed is equal to or smaller than a so-called critical speed, then the oscillations are damped. If the vehicular speed is equal to the critical speed, the oscillations are undamped. If the vehicular speed is more than the critical speed, the amplitude of the oscillations increases.

The value of the critical speed is a function of geometric data such as wheelbase and drawbar length, a function of the mass of the tractor (vehicle) and trailer, a function of the rotational inertia moment, and a function of a skid-angle rigidity of the axles. In a combination vehicle of the passenger car type, this value typically varies in a range from 90 to 130 km/h. The frequency of the snake movement or of the pendulum motion is approximately 0.5 to 1.5 Hz.

In order to solve such a problem, there is known a stabilizing method and apparatus for damping the pendulum motion as described in U.S. Pat. No. 6,523,911 B1. According to the method and apparatus, in order to stabilize the traveling condition of a vehicle, particularly, a passenger car towing a trailer, the vehicle monitors a lateral dynamics value such as a lateral acceleration or a yaw rate with respect to the pendulum motion to thereby detect the pendulum motion. When the pendulum motion is detected, the yaw moment which is almost periodical and almost opposite in the phase with respect to the pendulum motion is generated by the automatic braking operation and applied to the vehicle. In this manner, the snake movement of the combination vehicle composed of a tractor (vehicle) and a trailer can be avoided and the traveling condition of the combination vehicle can be stabilized.

In the aforesaid related art, it is determined that the pendulum movement occurs when a deviation $\omega_e$ ($\omega_e = \omega - \omega_t$) between a yaw rate $\omega$ on the tractor (vehicle) side and a target yaw rate $\omega_t$ exceeds a predetermined threshold value. Thus, a control value for damping the pendulum movement is determined so as to generate a yaw moment of which phase is in opposite to that of the deviation $\omega_e$. The target yaw rate $\omega_t$ is determined by a mathematical model which is a function of a vehicular speed $V_f$ and the steering angle $\delta$ of a front wheel.

However, when the target yaw rate $\omega_t$ is used for detecting the pendulum movement, by the reasons explained below, the suitable control value for damping the pendulum movement and the suitable output timing (phase) thereof can not be determined and hence there may arises an inconvenience for the control.

(1) When an output value of a yaw rate sensor drifts due to the zero point deviation etc. of the output value of the yaw rate sensor or a steering angle sensor, there exists a steady deviation between the yaw rate to and the target yaw rate $\omega_t$. Thus, since the accurate cycle and amplitude of the pendulum movement can not be obtained, the suitable control value can not be calculated.

(2) Normally, the condition at the time of combining the trailer is not taken into consideration for the calculation of the target yaw rate $\omega_t$ of a vehicle. Thus, when a vehicle coupled with a trailer turns, there arises the steady deviation between the actual yaw rate to and the target yaw rate $\omega_t$ due to the coupling with the trailer, whereby the suitable control value can not be calculated like the case (1).

(3) There arises a time delay until the fluid pressure of the wheel brake increases actually after the pendulum movement is detected and an instruction signal for starting the stabilizing control. Thus, since it is impossible to generate a yaw moment which phase is completely in opposite to that of the deviation $\omega_e$, that is, the control is delayed in phase and the pendulum movement can not be damped sufficiently.

SUMMARY OF THE INVENTION

The invention is made in view of the aforesaid circumstances and an object of the invention is to provide a movement stabilizing apparatus for a combination vehicle which can effectively suppress the pendulum movement of a vehicle towing a trailer.

In order to attain the aforesaid object, according to a first aspect of the invention, there is provided a movement stabilizing apparatus for a combination vehicle which includes a tractor and a trailer coupled to the tractor via a hitch so as to be swingable laterally, including:

a yaw rate sensor which detects a yaw rate of the tractor;

a differential unit which performs temporal differentiation on the detected yaw rate to calculate a yaw acceleration;

a cycle calculation unit which calculates a cycle or a frequency of the yaw acceleration at a time where the yaw acceleration changes to a negative or a positive value;

a first-order lag processing unit which performs first-order lag processing on the yaw acceleration based on the calculated cycle or the frequency;

a pendulum movement detection unit which detects a pendulum movement of the trailer based on the yaw acceleration or a cycle or a frequency of an output of the first-order lag processing unit and an amplitude of the yaw acceleration; and a control amount output unit which outputs a control amount based on the output of the first-order lag processing unit and an output of the pendulum movement detection unit, wherein the control amount is outputted to a deceleration control device or a yaw movement control device of the tractor to stabilize a traveling of the combination vehicle.

According to the first aspect of the invention, since a constant deviation of the yaw rate can be removed from the yaw acceleration, there does not arise such a problem that a unsuitable control amount is calculated due to the constant deviation in the case of calculating the control amount for damping the pendulum movement based on a deviation between the yaw rate and a target yaw rate, for example.

Further, the yaw acceleration advances in its phase by 90 degree than that of the yaw rate and so it is possible to subject the yaw acceleration to the first-order lag processing so as to adjust to the phase of the pendulum movement. Thus, with respect to the time delay until the actual control of the yaw moment, for example, the time delay such as the delay of the increase of the brake hydraulic pressure, the effects can be taken into the time constant for the first-order lag processing, so that the control amount can be outputted at a suitable output timing.

According to a second aspect of the invention, in addition to the first aspect of the invention, the movement stabilizing apparatus further includes;

a time constant setting unit which sets a phase of the output of the first-order lag processing unit so as to advance than a phase of the yaw rate, based on an output of the cycle calculation unit.

According to the second aspect of the invention, since the cycle or frequency is calculated from the yaw acceleration and the time constant used for the first-order lag processing is set based on the cycle or the frequency thus calculated, the control amount of the opposite phase for damping the pendulum movement which is accorded to the detected cycle of the pendulum movement can be suitably outputted.

According to a third aspect of the invention, as set forth in the second aspect of the invention, the time constant and a gain which are used at the time of performing the first-order lag processing are determined based on a cycle or a period which is determined based on the pendulum movement of the trailer, and the time constant and the gain increase as a length of the cycle which is determined based on the pendulum movement of the trailer increases.

According to the first aspect of the invention, the movement stabilizing apparatus for a combination vehicle is provided which can output the control amount of the opposite phase having no delay even taking into account of the control delay with respect to the phase of the pendulum movement, without being influenced by the constant deviation which may be contained in the yaw rate.

According to the second aspect of the invention, the movement stabilizing apparatus for a combination vehicle is provided which can perform the stabilizing control in accordance with the cycle of the pendulum movement.

DETAILED DESCRIPTION OF THE PREFERRED EMBODIMENTS

Figure 1:
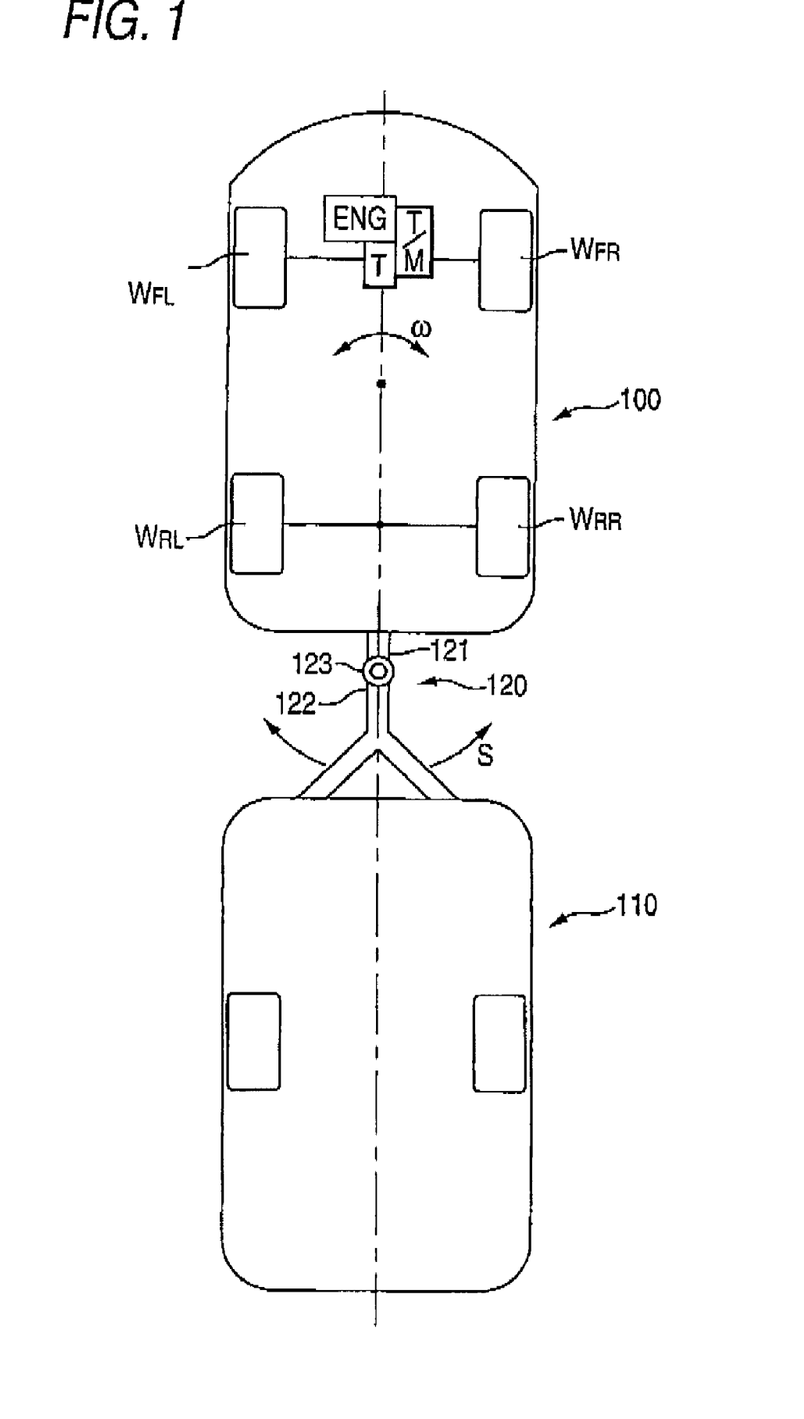
FIG. 1 is a diagram showing a combination vehicle according to an embodiment of the invention.

Hereinafter the embodiment according to the invention will be explained with reference to accompanying drawings, FIG. 1 is a diagram showing a combined vehicle according to the embodiment of the invention.

Figure 2:
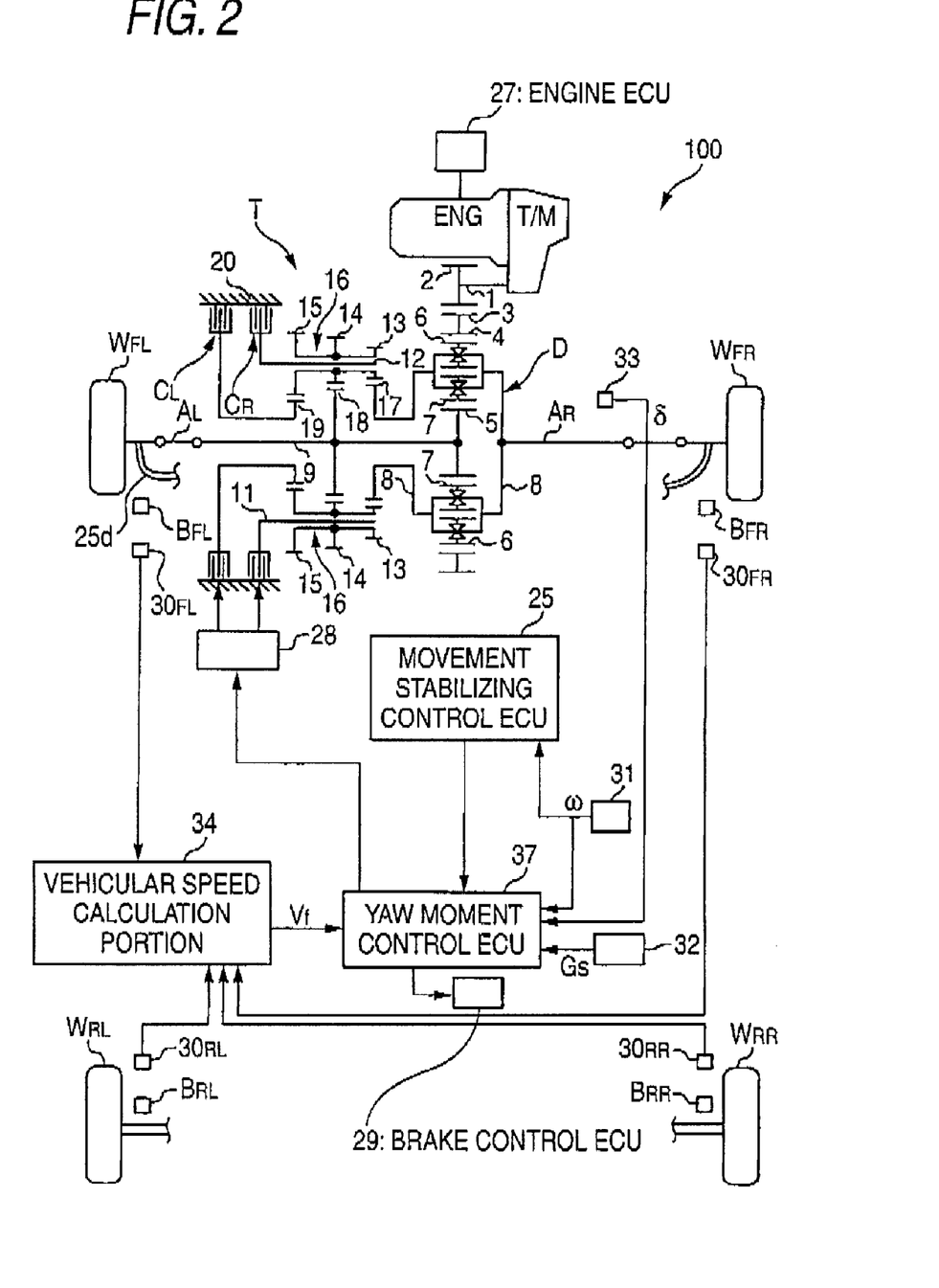
FIG. 2 is a diagram showing the combination of a skeleton diagram showing the power transmission system of a vehicle to which the movement stabilizing apparatus for a combination vehicle according to the embodiment of the invention is applied and a block diagram showing the combination of the movement stabilizing apparatus for a combination vehicle and a driving force distribution control apparatus.

FIG. 2 is a skeleton diagram showing the power transmission system of a vehicle to which the movement stabilizing apparatus for a combination vehicle according to the embodiment of the invention is applied and also a block diagram showing the combination of the movement stabilizing apparatus for a combination vehicle and a driving force distribution control apparatus.

Figure 3:
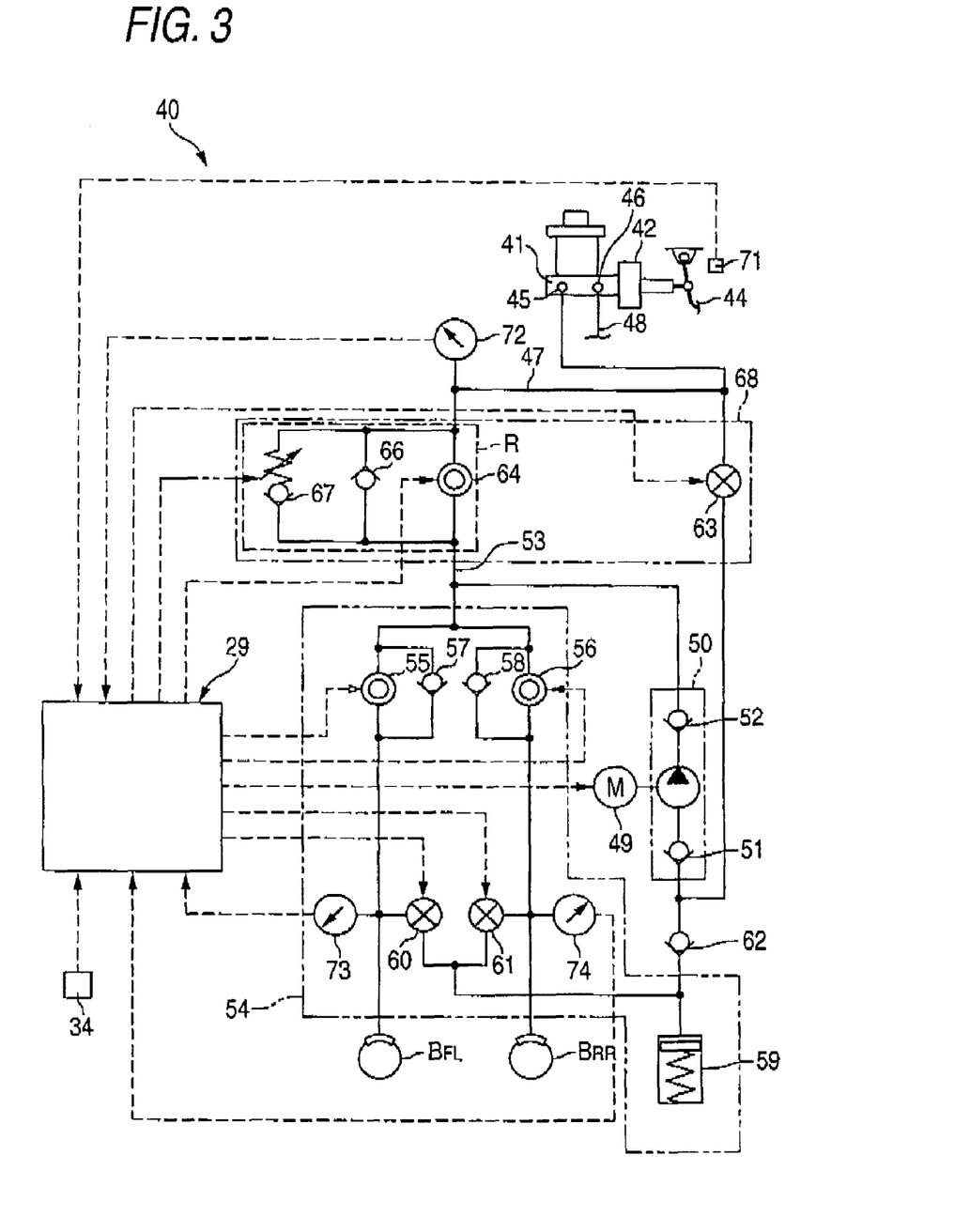
FIG. 3 is a hydraulic system diagram showing the configuration of a brake apparatus for a vehicle.

FIG. 3 is a hydraulic system diagram showing the configuration of the brake apparatus for a vehicle.

As shown in FIG. 1, a vehicle (tractor) 100 of a front-wheel drive type and a trailer 110 constitute a combined vehicle coupled via a hitch 120.

The hitch 120 is configured by a hitch member 121 attached to the rear portion of the vehicle 100 and a tongue 122 attached to the front portion of a trailer 110 and the coupling is made in a manner that a ball coupler provided at the tip end of the tongue 122 is covered from the upper direction over a hitch ball of the hitch member 121.

The trailer 110 is freely swingable laterally about the vertical shaft at a hitch portion 123 between the hitch ball and the ball coupler of the hitch 120. In FIG. 1, "S" denotes the turning or steering angle of the trailer with respect to the vehicle 100 and "$\omega$" denotes a yaw rate with respect to the center of the body of the vehicle 100.

As shown in FIG. 2, the vehicle 100 is a front-wheel drive vehicle and includes a driving force distribution apparatus T. The vehicle includes as the movement control apparatus for a vehicle, a yaw moment control electronic control unit (hereinafter called a yaw moment ECU) 37 which controls the driving force distribution apparatus T for the movement control at the time of steering via a hydraulic circuit 28 or which controls a brake electronic control unit (hereinafter called a brake control ECU (electric control unit)) 29. Further, the vehicle includes various kinds of sensors such as wheel speed sensors $30_{FL}$, $30_{FR}$, $30_{RL}$, $30_{RR}$, a yaw rate sensor 31 and a lateral acceleration sensor 32.

The vehicle 100 includes, as one feature of the invention, a movement stabilizing control electronic control unit (hereinafter called a movement stabilizing control ECU) 25 which detects the pendulum movement of the combination vehicle, then calculates a yaw control amount for damping the pendulum movement and outputs the amount to the yaw moment control ECU 37. The movement stabilizing control ECU 25 constitutes the movement stabilizing apparatus according to the invention. The yaw control amount corresponds to a control amount recited in the first aspect of the invention.

Further, there are provided with an engine electronic control unit (hereinafter called an engine ECU) 27 and a not-shown T/M control electronic control unit (hereinafter called a T/M control ECU) for controlling the operation of a transmission T/M in cooperation with the engine ECU 27.

(Power Transmission System)

First, the power transmission system for a vehicle to which the movement stabilizing apparatus according to the invention is applied will be explained. The transmission T/M is coupled at the right end of the engine ENG mounted transversely at the front portion of the vehicle. The driving force distribution apparatus T is disposed at the rear portion side of the engine ENG and the transmission T/M. A left front wheel $W_{FL}$ and a right front wheel $W_{FR}$ serving as driving wheels are coupled to a left drive shaft $A_L$ and a right drive shaft $A_R$ extended from the left end and the right end of the driving force distribution apparatus T, respectively.

The driving force distribution apparatus T includes a differential D to which a driving force is transmitted from an external gear 3 which meshes with an input gear 2 provided at an input shaft 1 extending from the transmission T/M.

The differential D is formed by a planet gear mechanism of double pinion type and which includes:
- a ring gear 4 formed integrally with the external gear 3,
- a sun gear 5 coaxially provided within the ring gear 4,
- an outer planetary gear 6 meshed with the ring gear 4,
- an inner planetary gear 7 meshed with the sun gear 5 and
- a planetary carrier 8 for supporting these gears in a mutually meshed state.

The differential D is arranged in a manner that the ring gear 4 acts as an input element, the sun gear 5 acting as one output element is coupled to the left drive shaft $A_L$ via a half shaft 9, and the planetary carrier 8 acting as the other output element is coupled to the right drive shaft $A_R$.

A member 11 supported by the outer periphery of the half shaft 9 so as to be rotatable freely includes four pinion shafts 12 disposed in the circumferential direction with an interval of 90 degree. Triple pinion members 16 each integrally formed by a first pinion 13, a second pinion 14 and a third pinion 15 are supported by the pinion shafts 12 so as to be rotatable freely, respectively. Although the number of the triple pinion members 16 is four in this embodiment, the number is not limited to four and may be two or more.

A first sun gear 17, which is supported by the outer periphery of the half shaft 9 so as to be rotatable freely and meshes with the first pinion 13, is coupled to the planetary carrier 8 of the differential D. A second sun gear 18 fixed to the outer periphery of the half shaft 9 meshes with the second pinion 14. A third sun gear 19 supported by the outer periphery of the half shaft 9 so as to be rotatable freely meshes with the third pinion 15.

The third sun gear 19 can be coupled with a casing 20 via a left hydraulic clutch $C_L$, whereby the rotation speed of the member 11 can be increased by the engagement of the left hydraulic clutch $C_L$. The member 11 can be coupled with the casing 20 via a right hydraulic clutch $C_R$, whereby the rotation speed of the member 11 can be reduced by the engagement of the right hydraulic clutch $C_R$.

Each of the left hydraulic clutch $C_L$ and the right hydraulic clutch $C_R$ is controlled by the yaw moment control ECU 37 via the hydraulic circuit 28.

The configurations of the differential D, the driving force distribution apparatus T and the hydraulic circuit 28 are described in paragraphs [0016] to [0031] and shown in FIGS. 2 to 5 of Japanese Patent Unexamined Publication JP-A-9-309357, for example, and so the detailed explanation thereof is omitted.

Next, the action of the driving force distribution apparatus T will be explained.

In the straight traveling state of the vehicle, each of the left hydraulic clutch $C_L$ and the right hydraulic clutch $C_R$ is placed in the non-engaging state. Thus, the restriction of each of the member 11 and the third sun gear 19 is released, whereby the half shaft 9, the left drive shaft $A_L$, the right drive shaft $A_R$, the planetary carrier 8 of the differential D and the member 11 rotate in an integral manner as a whole. In this case, the torque of the engine ENG is uniformly transmitted to the left and right front wheels $W_{FL}$, $W_{FR}$ from the differential D.

When the vehicle turns to the right direction, the right hydraulic clutch $C_R$ engages via the yaw moment control ECU 37 and the hydraulic circuit 28, whereby the member 11 is engaged with the casing 20 and stopped. In this case, since the half shaft 9 and the left drive shaft $A_L$ integrated with the left front wheel $W_{FL}$ and the right drive shaft $A_R$ integrated with the right front wheel $W_{FR}$ (that is, the planetary carrier 8 of the differential D) are coupled to each other via the second sun gear 18, the second pinion 14, the first pinion 13 and the first sun gear 17, the rotation speed $N_L$ of the left front wheel $W_{FL}$ is increased with respect to the rotation speed $N_R$ of the right front wheel $W_{FR}$.

When the rotation speed $N_L$ of the left front wheel $W_{FL}$ is increased with respect to the rotation speed $N_R$ of the right front wheel $W_{FR}$, a part of the torque of the right front wheel $W_{FR}$ as a turning inner wheel can be transmitted to the left front wheel $W_{FL}$ as a turning outer wheel.

In place of stopping the member 11 by the right hydraulic clutch $C_R$, the engaging force of the right hydraulic clutch $C_R$ may be adjusted suitably to reduce the rotation speed of the member 11. Thus, the rotation speed $N_L$ of the left front wheel $W_{FL}$ is increased with respect to the rotation speed $N_R$ of the right front wheel $W_{FR}$ in accordance with the reduction of the rotation speed of the carrier member, whereby an arbitrary torque can be transmitted to the left front wheel $W_{FL}$ as the turning outer wheel from the right front wheel $W_{FR}$ as the turning inner wheel.

On the other hand, when the vehicle turns to the left direction, the left hydraulic clutch $C_L$ engages via the yaw moment control ECU 37 and the hydraulic circuit 28, whereby the third pinion 15 is coupled to the casing 20 via the third sun gear 19. As a result, the rotation speed of the member 11 is increased with respect to the rotation speed of the half shaft 9, whereby the rotation speed $N_R$ of the right front wheel $W_{FR}$ is increased with respect to the rotation speed $N_L$ of the left front wheel $W_{FL}$.

When the rotation speed $N_R$ of the right front wheel $W_{FR}$ is increased with respect to the rotation speed $N_L$ of the left front wheel $W_{FL}$, a part of the torque of the left front wheel $W_{FL}$ as a turning inner wheel can be transmitted to the right front wheel $W_{FR}$ as a turning outer wheel.

In this case, also the engaging force of the right hydraulic clutch $C_L$ may be adjusted suitably to increase the rotation speed of the member 11. Thus, the rotation speed $N_R$ of the right front wheel $W_{FR}$ is increased with respect to the rotation speed $N_L$ of the left front wheel $W_{FL}$ in accordance with the increase of the rotation speed of the carrier member, whereby an arbitrary torque can be transmitted to the right front wheel $W_{FR}$ as the turning outer wheel from the left front wheel $W_{FL}$ as the turning inner wheel.

The wheels $W_{FL}$, $W_{FR}$, $W_{RL}$, $W_{RR}$ are respectively provided with the wheel speed sensors $30_{FL}$, $30_{FR}$, $30_{RL}$, $30_{RR}$, each of which detects a wheel speed and outputs the detected wheel speed to a vehicular speed calculation portion 34 for calculating the vehicular speed $V_f$.

The portion calculates the vehicular speed $V_f$ based on the detected respective wheel speeds. The calculated vehicular speed $V_f$ is inputted into the yaw moment control ECU 37.

The wheels $W_{FL}$, $W_{FR}$, $W_{RL}$, $W_{RR}$ are respectively provided with brakes $B_{FL}$, $B_{FR}$, $B_{RL}$, $B_{RR}$ which are controlled by the brake control ECU 29.

(Brake Apparatus)

FIG. 3 is a hydraulic system diagram showing the configuration of a brake apparatus for the vehicle. First, in the brake apparatus 40 shown in FIG. 3, a master cylinder 41 mounted on the vehicle 100 is applied with a brake operation force from a brake pedal 44 via a negative-pressure booster 42.

The master cylinder 41 is configured in a tandem type and includes: for example, a first output port 45 corresponding to the wheel brake $B_{FL}$ for the left front wheel (see FIG. 1) and the wheel brake $B_{RR}$ for the right rear wheel (see FIG. 1); and a second output port 46 corresponding to the wheel brake $B_{FR}$ for the right front wheel (see FIG. 1) and the wheel brake $B_{RL}$ for the left rear wheel (see FIG. 1). The first and second output ports 45, 46 are coupled to output hydraulic paths 47, 48, respectively.

The brake apparatus 40 on the first output port 45 side has the same configuration as the brake apparatus 40 on the second output port 46 side. Hereinafter, the explanation will be made only as to the brake apparatus on the first output port 45 side and the explanation of the brake apparatus on the second output port 46 side will be omitted.

The output hydraulic pressure of the master cylinder 41 can be increased by a pump 5, which has a suction valve 51 and a discharge valve 52 and is driven by a motor 49. The discharge side of the pump 50, that is, the discharge valve 52 is coupled to a hydraulic path 53.

A pressure regulating unit 54 is provided between the hydraulic path 53 and the both wheel brakes $B_{FL}$, $B_{RR}$. The pressure regulating unit 54 includes:

a normally-open electromagnetic valve 55 provided between wheel brake $B_{FL}$ for the left front wheel and the hydraulic path 53;

a normally-closed electromagnetic valve 56 disposed between the right rear wheel brake $B_{RR}$ and the hydraulic path 53;

a pair of one-way valves 57, 58 which allow the flow of brake fluid from the wheel brakes $B_{FL}$, $B_{RR}$ side to the hydraulic path 53 side and which are respectively coupled in parallel to the normally-open electromagnetic valves 55, 56;

a single reservoir 59 which is common to the both wheel brakes $B_{FL}$, $B_{RR}$; and normally-closed electromagnetic valves 60, 61 provided between the reservoir 59 and the respective wheel brakes $B_{FL}$, $B_{RR}$, respectively.

The reservoir 59 is coupled to the suction side of the pump 50, that is, the suction valve 51 via a check valve 62.

The pressure regulating unit 54 can be switched among following three states:

a state where the normally-open electromagnetic valves 55, 56 are opened and the normally-closed electromagnetic valves 60, 61 are closed to apply the hydraulic pressure of the hydraulic path 53 on the wheel brakes $B_{FL}$, $B_{RR}$;

a state where the normally-open electromagnetic valves 55, 56 are closed and the normally-closed electromagnetic valves 60, 61 are also closed to hold the brake hydraulic pressure at the wheel brakes $B_{FL}$, $B_{RR}$; and a state where the normally-open electromagnetic valves 55, 56 are closed and the normally-closed electromagnetic valves 60, 61 are opened to release the brake hydraulic pressure of the wheel brakes $B_{FL}$, $B_{RR}$ to the reservoir 59.

By controlling the opening/closing of each of the normally-open electromagnetic valves 55, 56 and the normally-closed electromagnetic valves 60, 61, the hydraulic pressure of the hydraulic path 53 can be controlled and applied to the wheel brakes $B_{FL}$, $B_{RR}$.

The output hydraulic path 47 is coupled to the suction side of the pump 50, that is, between the valve 51 and the valve 62 via a normally-closed electromagnetic valve 63 and also coupled to the hydraulic path 53 via a regulator R.

The regulator R includes:

a function of switching between a state of allowing the brake fluid to flow from the output hydraulic path 47 to the hydraulic path 53 and a state of interrupting the flow;

a function of adjusting the brake fluid pressure on the downstream side of the regulator R to a set value or less when the brake fluid is interrupted from flowing from the output hydraulic path 47 to the hydraulic path 53; and a function of allowing the brake fluid to flow from the upstream side to the downstream side (that is, from the output hydraulic path 47 to the hydraulic path 53) when the brake fluid pressure on the upstream side becomes larger than the brake fluid pressure on the downstream side.

In this embodiment, the regulator includes a normally-open electromagnetic valve 64, a one-way valve 66 and a relief valve 67.

The normally-open electromagnetic valve 64 opens and closes hydraulic paths (the output hydraulic path 47 and the hydraulic path 53) communicating between the master cylinder 41 and the wheel brake $B_{FL}$ for the left front wheel, the wheel brake $B_{RR}$ for the right rear wheel. This valve 64 is a normally-opened type electromagnetic valve disposed between the output hydraulic path 47 and the hydraulic path 53, and allows the brake fluid to flow when the valve is opened and interrupt the flow when the valve is closed.

The normally-open electromagnetic valve 64 is arranged in a manner that a not-shown electromagnetic coil for driving the valve thereof is electrically coupled to the brake control ECU 29, whereby the valve is closed when the electromagnetic coil is energized based on an instruction from the brake control ECU 29 and the valve is opened when the electromagnetic coil is deenergized.

The normally-open electromagnetic valve 64 is configured by a linear type electromagnetic valve which opening valve pressure can be controlled.

The one-way valve 66 is a valve which only allows the brake fluid to flow from the upper stream side to the downstream side and is provided in parallel to the normally-open electromagnetic valve 64.

The relief valve 67 is opened when a value obtained by subtracting the brake fluid pressure of the output hydraulic path 47 from the brake fluid pressure of the hydraulic path 53 becomes a valve opening pressure thereof or more. However, in this embodiment, the relief valve is included in the normally-open electromagnetic valve 64 as one function.

The magnitude of the valve opening pressure of the relief valve 67 (the valve opening pressure of the normally-open electromagnetic valve 64) can be increased/decreased by controlling the current value supplied to the electromagnetic coil for driving the electromagnetic valve.

The normally-closed electromagnetic valve 63 and the regulator R constitute in a cooperative manner a brake actuator 68 acting as a deceleration actuator.

In the brake actuator 68, a brake output gain, which is a ratio of a brake output with respect to the brake operation input of a driver ((quotient value of the brake fluid pressure of the hydraulic path 53/the operation force of the brake pedal 44) or (quotient value of the deceleration speed of the vehicle/ the operation force of the brake pedal 44)), can be changed by adjusting the relief pressure (the valve opening pressure of the normally-open electromagnetic valve 64) of the relief valve 67 in a state where the normally-closed electromagnetic valve 63 is opened and the normally-open electromagnetic valve 64 is closed, whereby the brake pressure acting on the wheel brakes $B_{FL}$, $B_{RR}$, that is, the brake force generated by the wheel brakes $B_{FL}$, $B_{RR}$ can be adjusted.

Further, in the case where the brake is not operated by the driver, by adjusting the relief pressure (the valve opening pressure of the normally-open electromagnetic valve 64) of the relief valve 67 in a state where the normally-closed electromagnetic valve 63 is opened and the normally-open electromagnetic valve 64 is closed, the adjusted brake pressure can be acted on the wheel brakes $B_{FL}$, $B_{RR}$ to automatically operate the wheel brakes $B_{FL}$, $B_{RR}$.

The brake control ECU 29 acting as a deceleration control unit controls:

the on/off operation of the motor 49 for driving the pump 50;

the opening/closing operation of each of the normally-open electromagnetic valves 55, 56 and the normally-closed electromagnetic valves 60, 61 of the pressure regulating unit 54;

the opening/closing operation of each of the normally-closed electromagnetic valve 63 and the normally-opened electromagnetic valve 64 in the brake actuator 68; and the relief pressure of the relief valve 67 (the valve opening pressure of the normally-open electromagnetic valve 64).

The brake control ECU 29 receives respective signals from:

the vehicular speed calculation portion 34;

a brake operation detection sensor 71 for detecting the depressing operation of the brake pedal 44 by the driver;

a brake master pressure sensor 72 for detecting the fluid pressure of the output hydraulic path 47 which is the output pressure of the master cylinder 41; and wheel brake pressure sensors 73, 74 for detecting the brake pressures of the wheel brakes $B_{FL}$, $B_{RR}$.

(Configuration of Movement Control Apparatus)

Next, the explanation will be made with reference to FIG. 2 (FIGS. 1 and 3 will also be referred as necessary) as to the configuration of the movement control apparatus including the movement stabilizing control ECU 25 serving as the movement stabilizing apparatus for a combination vehicle according to the embodiment.

As well as the engine ECU 27, the brake control ECU 29, the yaw moment control ECU 37 and the not-shown T/M control ECU, the movement stabilizing control ECU 25 serving as the movement stabilizing apparatus for a combination vehicle, includes an ECU (electric control unit) having a CPU (central processing unit), a ROM (read only memory), a RAM (random access memory) and a predetermined electric circuit, which are mutually coupled by communication lines as shown in FIG. 2 although a part of the communication lines is not shown.

As shown in FIG. 6 of JP-A-2003-170822, for example, the yaw moment control ECU 37 has a function of calculating a control yaw moment based on a signal representing a vehicular speed $V_f$ from the vehicular speed calculation portion 34 for calculating a vehicular speed based on the wheel speed sensor 30 ($30_{FL}$, $30_{FR}$, $30_{RL}$, $30_{RR}$ in FIG. 2) and respective signals from the yaw rate sensor 31, the lateral acceleration sensor 32, and a steering angle sensor 33 for detecting a steering angle representing the direction of the front wheels to thereby control the turning movement of the vehicle.

To be concrete, the yaw moment control ECU 37 (1) obtains a yaw rate ω, a lateral acceleration $G_s$, a steering angle δ and a vehicular speed $V_f$, (2) then calculates a standard yaw rate based on the lateral acceleration $G_s$, the steering angle δ and the vehicular speed $V_f$, and (3) calculates a turning moment based on a difference between the standard yaw rate and an actual yaw rate ω of the vehicle. Further, the yaw moment control ECU (4) calculates a slip angle of the vehicle body based on the yaw rate ω, the vehicular speed $V_f$, the lateral acceleration $G_s$ and the steering angle δ, then calculates a restoring moment and adds the restoring moment to the turning moment to thereby obtain a control yaw moment.

Then, the yaw moment control ECU 37 calculates a driving force distribution amount for obtaining a yaw rate accorded to the turning state of the vehicle based on an engine rotation speed and an engine torque from the engine ECU 27, signals from the brake operation detection sensor 71 (see FIG. 3) and a not-shown accelerator operation detection sensor and the vehicular speed $V_f$ etc. to thereby control the driving force distribution apparatus T via the hydraulic circuit 28. Further, the yaw moment control ECU calculates a braking force distribution amount for obtaining a yaw rate accorded to the turning state of the vehicle to thereby control the brakes $B_{FL}$, $B_{FR}$, $B_{RL}$, $B_{RR}$ of the respective wheels via the brake control ECU 29.

The brake control ECU 29 also has the known ADS (anti-lock brake system) control function.

(Gist of Main Portion of Control Logic of Movement Stabilizing Control ECU)

Next, the control logic of the movement stabilizing control ECU 25 will be explained in detail with reference to FIGS. 4 and 5.

Figure 4:
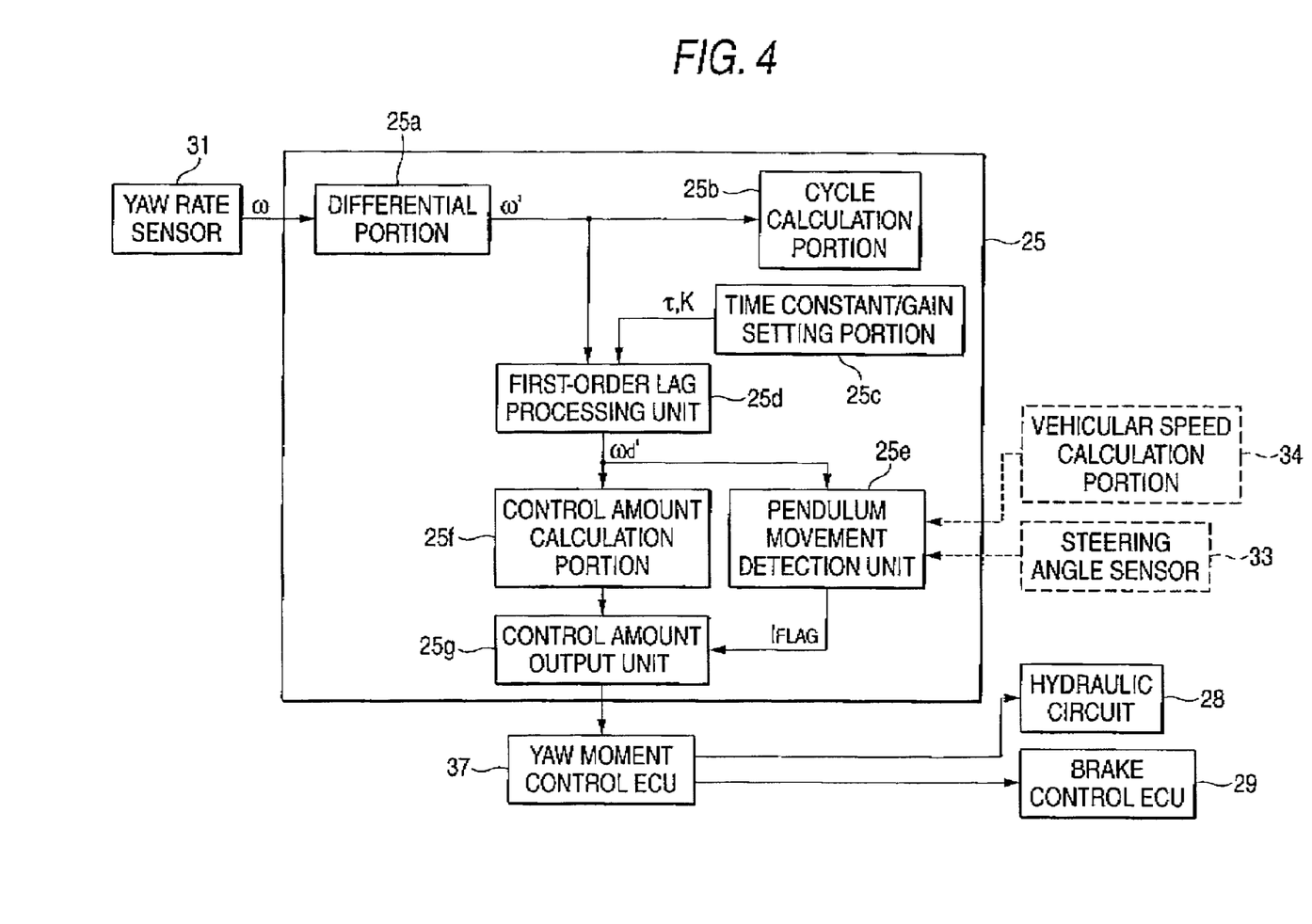
FIG. 4 is a block diagram for explaining the main portion of the control logic of the movement stabilizing apparatus for a combination vehicle.

FIG. 4 is a block diagram for explaining the main portion of the control logic of the movement stabilizing apparatus for a combination vehicle.

Figures 5A, 5B:
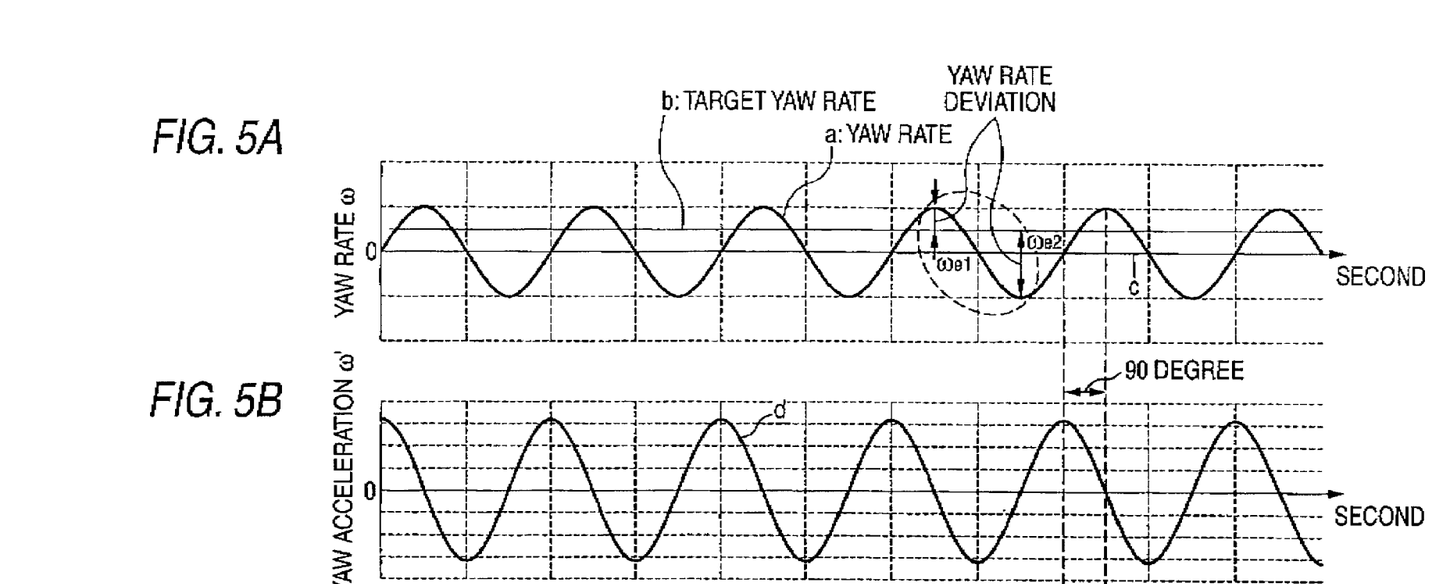
FIG. 5A is a diagram showing a curve of the yaw rate $\omega$ changing in a cosine shape and a target yaw rate $\omega_t$ having a steady deviation.
FIG. 5B is a diagram showing the time change of the yaw acceleration a obtained by subjecting the yaw rate $\omega$ of FIG. 5A to the time differentiation.
Figure 5C:
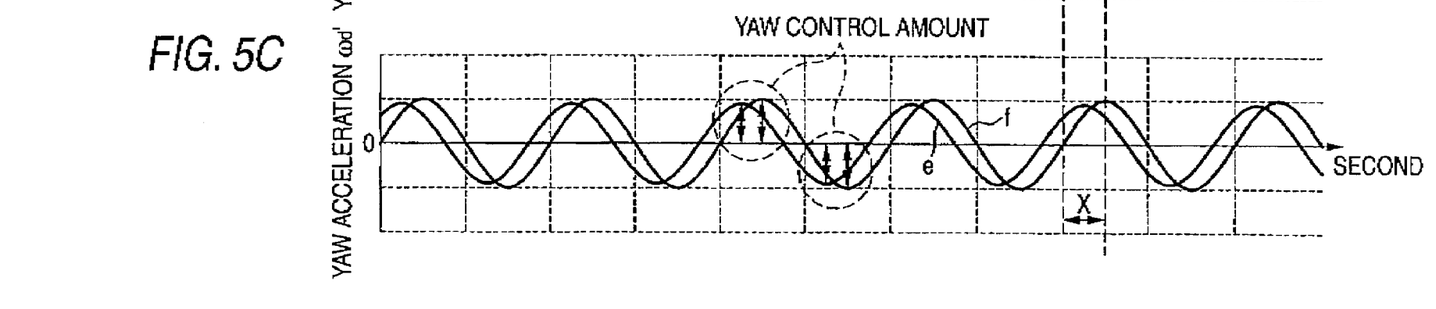
FIG. 5C is a diagram showing time change of the yaw acceleration $\omega_d{'}$ obtained by subjecting the yaw acceleration $\omega'$ of FIG. 5B to the first-order lag processing.

FIGS. 5A to 5C are diagrams explaining the relation among a yaw rate ω, a yaw acceleration ω' and a yaw acceleration $ω_d'$ after the first-order lag processing, FIG. 5A represents a curve of the yaw rate ω changing in a cosine shape and a target yaw rate $ω_t$ having a steady deviation, FIG. 5B represents the time change of the yaw acceleration ω' obtained by subjecting the yaw rate ω of FIG. 5A to the time differentiation, and FIG. 5C represents the time change of the yaw acceleration $ω_d'$ obtained by subjecting the yaw acceleration ω' of FIG. 5B to the first-order lag processing.

The movement stabilizing control ECU 25 includes a differential portion 25a, a cycle calculation portion 25b, a time constant/gain setting portion (time constant setting unit) 25c, a first-order lag processing portion 25d, a pendulum movement detection portion 25e, a control amount calculation portion (control amount output unit) 25f and a control amount output portion (control amount output unit) 25g. The functions of these functional portions are executed by repeatedly processing with a constant cycle at the CPU based on a program and data stored in the ROM constituting the movement stabilizing control ECU 25.

If the vehicle 100 tows the trailer 110 and the trailer 110 starts the pendulum movement, the vehicle 100 starts the yaw movement via the hitch 120 (see FIG. 1) and so the yaw rate sensor 31 outputs the yaw rate ω.

The differential portion 25a performs temporal differentiation on the yaw rate ω from the yaw rate sensor 31 to calculate the yaw acceleration ω' and outputs the yaw acceleration to the cycle calculation portion 25b and the first-order lag processing portion 25d.

The cycle calculation portion 25b calculates, based on the yaw acceleration ω' outputted from the differential portion 25a, a cycle or a frequency of the yaw acceleration at the time where the yaw acceleration changes to a negative or a positive value, to thereby calculate the cycle or frequency of the yaw movement of the vehicle 100.

The time constant/gain setting portion 25c sets a time constant τ and a gain K used at the time of performing a first-order lag processing on the yaw acceleration ω' at the first-order lag processing portion 25d, with reference to a function stored in the ROM in advance or data of a look-up table. The function or the data of the look-up table for determining the time constant τ and the gain K is configured so as to determine the time constant τ and the gain K depending on the cycle or the frequency of the yaw acceleration ω' due to the pendulum movement of the trailer 110.

When the cycle of the yaw acceleration a due to the pendulum movement of the trailer 110 is long, the time constant is set to be large in accordance with the cycle and further the gain K is made large. In contrast, when the cycle of the yaw acceleration ω' due to the pendulum movement of the trailer 110 is short, the time constant is set to be small in accordance with the cycle and further the gain K is made small.

The first-order lag processing portion 25d performs the first-order lag processing on the yaw acceleration ω' outputted from the differential portion 25a by using the time constant τ and the gain K set at the time constant/gain setting portion 25c.

In this case, since a time period from a time point where the yaw acceleration ω' became "0" previously to a time point where the yaw acceleration ω' becomes "0" at this time is a half of the cycle of the yaw movement, that is, the pendulum movement, the twice of the time period can be obtained as the cycle of the yaw acceleration ω'. Since the yaw acceleration ω' advances by 90 degree in its phase with respect to the yaw rate ω due to the time differentiation of the yaw rate ω, the time constant τ for the first-order lag processing may be set to ¼ of the obtained cycle.

The aforesaid matter can be expressed by the following control logic expression.

$$\phi = \tan^{-1}(2\pi f \cdot \tau) \quad (1)$$

Where "φ" represents a delay angle (90 degrees in this case), "f" represents the frequency (Hz) of the pendulum movement and "τ" represents a time constant.

Thus, the time constant can be represented by the following expression.

$$\tau = (\tan \phi)/2\pi f \quad (2)$$

In this case, although φ is 90 degree, since tan 90° becomes infinite, the time constant may be obtained in the following manner by using the look-up table.

That is, since the upper and lower limit values of the frequency f of the pendulum movement due to the resonance can be almost specified, the look-up table having the abscissa of the frequency f (obtained as a reciprocal of the cycle) and the ordinate of the time constant τ is prepared in advance in a manner that the time constant τ becomes larger as the frequency approaches the lower limit frequency and becomes smaller as the frequency approaches the upper limit frequency in the range between the upper and lower limit values. Thus, the time constant may be determined by searching the time constant τ from the frequency f with reference to the look-up table.

Further, there is an operation delay time from a time point where the yaw moment control ECU 37 outputs the yaw moment control signal to the hydraulic circuit 28 or the brake control ECU 29 to a time point where the hydraulic pressure increases or decreases at the hydraulic circuit 28 to thereby control the slip rate of the clutches $C_L$, $C_R$ or to a time point where the hydraulic pressure at the brake apparatus 40 increases to thereby actually operate the brake B ($B_{FL}$, $B_{FR}$, $B_{RL}$, $B_{RR}$ in FIG. 2). In view of the operation delay time, the time constant τ for the first-order lag processing is determined in a manner that, even if there is such the operation delay time, the driving force distribution or the braking force distribution corresponding to the yaw control amount (control amount) described later can be obtained with a phase in opposite to that of the yaw rate ω due to the pendulum movement detected by the pendulum movement detection portion 25e when the hydraulic circuit 28 or the brake apparatus 40 operates.

Thus, supporting that the operation delay time of the hydraulic circuit 28 or the brake apparatus 40 is almost constant, the time constant τ for the first-order lag processing is determined by subtracting the operation delay time from the ¼ of the cycle of the yaw acceleration ω' so that the yaw control amount described later can be outputted with a phase advancing by a value corresponding to the operation delay time that is the opposite phase of the yaw rate ω due to the pendulum movement Further, the gain K for the first-order lag processing is made larger as the cycle of the yaw acceleration ω' becomes longer and is made smaller as the cycle of the yaw acceleration becomes shorter. This is made in order to compensate that the magnitude of the yaw acceleration ω' becomes smaller as the cycle becomes longer and becomes larger as the cycle becomes shorter due to the time differentiation of the yaw rate .ω., and so in order to set the yaw acceleration $\omega_d'$ after the first-order lag processing to be a value corresponding to the magnitude of the yaw rate ω. Thus, the yaw control amount is set to be a value corresponding to the magnitude of the yaw rate ω (also becomes a value corresponding to the energy of the pendulum movement since the energy of the pendulum movement also relates to the magnitude of the yaw rate ω).

The pendulum movement detection portion 25e determines, as to the yaw acceleration $\omega_d'$ after the first-order lag processing outputted from the first-order lag processing portion 25d, whether or not the cycle thereof is within a range determined in advance in order to determine the pendulum movement and whether or not the amplitude thereof is equal to or more than a predetermined threshold value determined in advance in order to determine the pendulum movement, and outputs a pendulum movement detection flag $I_{FLAG}$ to the control amount output portion 25g.

When the cycle of the yaw acceleration $\omega_d'$ is within the predetermined range and the amplitude of the yaw acceleration $\omega_d'$ is equal to or more than the predetermined threshold value, the pendulum movement detection portion 25e determines that the pendulum movement is detected and so sets the pendulum movement detection flag $I_{FLAG}$ to 1. In contrast, when the cycle of the yaw acceleration $\omega_d'$ is not within the predetermined range or the amplitude of the yaw acceleration $\omega_d'$ is smaller than the predetermined threshold value, the pendulum movement detection portion 25e determines that the pendulum movement is not detected and so sets the pendulum movement detection flag $I_{FLAG}$ to 0.

The control amount calculation portion 25f multiplies the amplitude of the yaw acceleration $\omega_d'$ outputted from the first-order lag processing portion 25d by a predetermined constant with reference to the function, for example, stored in the ROM in advance or the date of the look-up table to calculate the yaw control amount with a phase in opposite to that of the yaw acceleration $\omega_d'$ and outputs the yaw control amount to the control amount output portion 25g. The function or the data of the look-up table for determining the predetermined constant is determined in accordance with the magnitude of the energy of the pendulum movement of the trailer 110, that is, the vehicular speed $V_f$ or the amplitude of the yaw acceleration $\omega_d'$ after the first-order lag processing.

In FIG. 5C, the absolute value of the yaw control amount is explained by the amplitude of the yaw acceleration $\omega_d'$.

The control amount output portion 25g does not output the yaw control amount outputted from the control amount calculation portion 25f to the yaw moment control ECU 37 when receiving the pendulum movement detection flag $I_{FLAG}=0$ from the pendulum movement detection portion 25e, whilst outputs the yaw control amount outputted from the control amount calculation portion 25f to the yaw moment control ECU 37 when receiving the pendulum movement detection flag $I_{FLAG}=1$ from the pendulum movement detection portion 25e.

The yaw moment control ECU 37 receives the signals representing the engine torque and the engine rotation speed from the engine ECU 27 and also receives the signal representing the vehicular speed, an accelerator pedal signal (accelerator opening degree signal) and a brake pedal signal. The yaw moment control ECU 37 determines a gear ratio of the transmission T/M based on the engine rotation speed and the vehicular speed $V_f$ and calculates driving forces respectively transmitted to the left and right front wheels $W_{FL}$, $W_{FR}$ based on the gear ratio and the engine torque.

When the driving force transmitted to the left and right front wheels $W_{FL}$, $W_{FR}$ is equal to or larger than the threshold value of the driving force depending on the vehicular speed $V_f$, the yaw moment control ECU 37 determines a turning amount by adding the yaw control amount to the current yaw rate .ω. and determines the driving force distribution amounts to be respectively distributed to the left and right front wheels $W_{FL}$, $W_{FR}$ based on a product of the turning amount and the driving force.

The threshold value of the driving force depending on the vehicular speed $V_f$ is stored in the ROM in advance and the yaw moment control ECU 37 refers the threshold value of the driving force to be transmitted to the left and right front wheels $W_{FL}$, $W_{FR}$ by using the vehicular speed $V_f$ as a parameter.

Next, the yaw moment control ECU 37 controls electric amounts to be supplied to the not-shown linear solenoids of the hydraulic circuit 28 so that the hydraulic pressures necessary for obtaining the driving force distributed amounts are outputted to the left hydraulic clutch $C_L$ and the right hydraulic clutch $C_R$, respectively.

In this case, for example, the left and right driving forces are distributed via the hydraulic circuit 28 also at the time of braking using the engine even when the accelerator pedal is not pressed.

The yaw moment control ECU 37 distributes the driving force by using the driving force distribution apparatus T when the braking force due to the braking using the engine or the driving force of the engine to be transmitted to the left and right front wheels $W_{FL}$, $W_{FR}$ is equal to or more than a threshold value set in advance with respect to the vehicular speed $V_f$. This is because sufficient yaw control ability for suppressing the pendulum movement can be obtained by distributing the driving force to the left and right front wheels $W_{FL}$, $W_{FR}$ by the driving force distribution apparatus T. In the coasting state of the vehicle 100, there arises a case where sufficient yaw control ability can not be obtained by the driving force distribution to the left and right front wheels $W_{FL}$, $W_{FR}$. In such a case, the brake apparatus 40 is used for suppressing the pendulum movement.

When the driving force transmitted to the left and right front wheels $W_{FL}$, $W_{FR}$ is smaller than the threshold value of the driving force depending on the vehicular speed $V_f$ when a driver operates the brake pedal to perform the braking operation or when not performing the brake using the engine, the yaw moment control ECU 37 distributes the braking forces for the left and right wheels via the brake control ECU 29 based on the yaw control amount.

As described above, according to the configuration of the embodiment, the yaw control amount is calculated based on the yaw acceleration ω' obtained by performing the temporal differentiation on the yaw rate ω. As compared with the case like the related art where the target yaw rate is calculated based on the steering angle δ and the vehicular speed $V_f$, and the control amount for damping the pendulum movement is determined in accordance with the deviation $ω_e$ between the target yaw rate $ω_t$ and the actual yaw rate ω so that the yaw moment having the phase in opposite to that of the deviation $ω_e$ is generated, the pendulum movement can be suppressed effectively by eliminating the calculation deviation of the target yaw rate at and the influence of the drift of the yaw rate sensor 31.

FIG. 5A shows a cosine-shaped time change of the yaw rate ω of the vehicle, FIG. 5B shows a time change of the yaw acceleration ω' corresponding to FIG. 5A, and FIG. 5C shows a time change of the yaw acceleration $ω_d'$ after the first-order lag processing showing an example of the case where the yaw acceleration ω' of FIG. 5B is performed the first-order lag processing.

For example, in the case where there arises a deviation in the target yaw rate $ω_t$ of the vehicle 100 towing the trailer 110 during the turning traveling at a constant vehicular speed, if the target yaw rate $ω_t$ is calculated like a straight line "b" despite that the target yaw rate should be originally calculated like a straight line "c" as shown of FIG. 5A, the deviation between the target yaw rate $ω_t$ and the yaw rate ω becomes $+ω_{e1}$ and $-ω_{e2}$. Thus, since largely different yaw control amounts, that is, $-.ω_{e1}$ and $+.ω_{e2}$ are calculated on the left and right sides of the pendulum movement in order to cancel the yaw rate .ω. of the vehicle due the pendulum movement, the pendulum movement can not be suppressed effectively.

In the similar manner, in the case where the output value of the yaw rate sensor 31 drifts, there also arises a steady deviation between the yaw rate ω and the target yaw rate $ω_t$ and so the similar problem occurs.

Further, according to the embodiment, the yaw acceleration ω' is obtained by performing the temporal differentiation on the yaw rate ω, then the yaw control amount is calculated based on the yaw acceleration ω' and the timing for outputting the yaw control amount is determined. Thus, as clear from the comparison between FIGS. 5A and 5B, the phase of the yaw acceleration ω' advances by 90 degree than that of the yaw rate.

Thus, the time constant τ used at the time of subjecting the yaw acceleration ω to the first-order lag processing is set in accordance with the cycle of the yaw acceleration ω' in a manner that the output timing of the yaw control amount obtained from the yaw acceleration $ω_d'$ after the first-order lag processing becomes in its phase in opposite to (different by 180 degree from) that of the actual yaw rate ω due to the pendulum movement of the trailer 110 which is convenient to damp the yaw movement due to the pendulum movement, even in view of the time delay of the increase of the fluid pressure of the brake apparatus 40 or the time delay of the change of the fluid pressure of the hydraulic circuit 28. Thus, the yaw control amount can be outputted at a suitable timing. As a result, the pendulum movement can be suppressed and damped effectively.

As shown in FIG. 5C, the phase of the time constant τ can be adjusted within a range of the band width X of the phase.

Further, as shown in FIG. 5C, the gain K of the yaw acceleration $ω_d'$ after the first-order lag processing for determining the yaw control amount is set in accordance with the cycle of the yaw acceleration ω' in a manner that the gain becomes larger as the cycle becomes longer and becomes smaller as the cycle becomes shorter, so that the yaw acceleration $ω_d'$ is set in accordance with the yaw rate ω. Thus, since the yaw control amount according to the magnitude of the energy of the pendulum movement is outputted, the pendulum movement can be damped suitably. Curve "f" indicates the yaw acceleration when the time constant is maximum.

The yaw moment control ECU 37 and the hydraulic circuit 28 of the embodiment constitute a yaw movement control device, the brake control ECU 29 constitutes a deceleration control device, and the control amount calculation portion 25f and the control amount output portion 25g constitute a control amount output unit.

MODIFIED EXAMPLE

Although the embodiment of the invention is explained in detail, the design of the invention can be changed in various manners without departing from the gist thereof.

In this embodiment, the control amount calculation portion 25f calculates the yaw control amount based on the yaw acceleration $\omega_d'$ outputted from the first-order lag processing portion 25d, and the control amount output portion 25g outputs the yaw control amount to the yaw moment control ECU 37 only when receiving the signal of the pendulum movement detection flag $I_{FLAG}=1$ representing the determination of the detection of the pendulum movement from the pendulum movement detection portion 25e. Instead of such an arrangement, the invention may be arranged in a manner that only when the signal of the pendulum movement detection flag $I_{FLAG}=1$ representing the determination of the detection of the pendulum movement is received from the pendulum movement detection portion 25e, the control amount calculation portion 25f calculates the yaw control amount and outputs the yaw control amount to the yaw moment control ECU 37. In this case, the function of the control amount output portion 25g is contained into the control amount calculation portion 25f.

Further, although, in this embodiment, the time constant τ is set at the time constant/gain setting portion 25c supporting that the operation delay time of the hydraulic circuit 28 or the brake apparatus 40 is almost constant, the invention is not limited thereto. When a driver operates the brake, since the brake fluid pressure is increased to some extent, the operation delay time of the brake apparatus 40 becomes short. Thus, the time constant τ may be set finely in accordance with the brake fluid pressure.

In this embodiment, the pendulum movement suppression control is made by the driving force distribution apparatus T when the transmission driving force applied to the road surface from the wheels $W_{FL}$, $W_{FR}$ as to the engine driving force according to the vehicular speed $V_f$ in the traveling state of the vehicle 100 is a predestined value or more the brake using the engine is operated. Further, in this embodiment, the pendulum movement suppression control is made by the brake apparatus 40 via the brake control ECU 29 when the brake using the engine is not operated and the transmission driving force applied to the road surface from the wheels $W_{FL}$, $W_{FR}$ as to the engine driving force according to the vehicular speed $V_f$ is smaller than the predestined value. However, the pendulum movement suppression control may be always made as to the left and right wheels by the brake apparatus 40 and the brake control ECU 29.

Further, although the pendulum movement detection portion 25e determines the pendulum movement based on the cycle and the amplitude of the yaw acceleration $\omega_d'$ after the first-order lag processing, the pendulum movement detection portion may determine the pendulum movement based on the cycle of the $\omega_d'$ acceleration $\omega'$ and the amplitude of the yaw acceleration $\omega_d'$ after the first-order lag processing.

Further, the pendulum movement detection portion 25e may determine, based on the signals from the steering angle sensor 33 and the vehicular speed calculation portion 34, whether the cycle of the yaw acceleration $\omega_d'$ after the first-order lag processing is caused by the periodical operation of the steering wheel by a driver or the pendulum movement, and may set the pendulum movement detection flag $I_{FLAG}$ to 1 only when it is determined that the cycle is caused by the pendulum movement in addition to the aforesaid condition.

Further, although the explanation is made as to a case where the embodiment is applied to a vehicle of a front-wheel drive type, the invention is not limited thereto. For example, in a vehicle of a tour-wheel-drive type, the pendulum movement suppression control may be performed by distributing the driving force to the left and right rear wheels.

Furthermore, as the yaw movement control device, a four-wheel steering apparatus may be employed in which the steering angle of the rear wheels can be controlled (steered) in its phase so as to be same as or in opposite to that of the front wheels.

Furthermore, since the energy of the pendulum movement reduces in accordance with the reduction of the vehicular speed $V_f$, the deceleration control device may employ the reduction control of the engine output or the automatic braking control without jointly employing the yaw movement control.

In this embodiment, although the movement stabilizing control ECU 25, the hydraulic circuit 28, the brake control ECU 29 and the yaw moment control ECU 37 are provided separately, a part or all of these constituent elements may be combined suitably.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A movement stabilizing apparatus for a combination vehicle which comprises a tractor and a trailer coupled to the tractor via a hitch so as to be swingable laterally, comprising:
    a yaw rate sensor which detects a yaw rate of the tractor;
    a differential unit which performs temporal differentiation on the detected yaw rate to calculate a yaw acceleration;
    a cycle calculation unit which calculates a cycle or a frequency of the yaw acceleration at a time where the yaw acceleration changes to a negative or a positive value;
    a first-order lag processing unit which performs first-order lag processing on the yaw acceleration based on the calculated cycle or the frequency;
    a pendulum movement detection unit which detects a pendulum movement of the trailer based on the yaw acceleration or a cycle or a frequency of an output of the first-order lag processing unit and an amplitude of the yaw acceleration; and
    a control amount output unit which outputs a control amount based on the output of the first-order lag processing unit and an output of the pendulum movement detection unit, wherein
    the control amount is outputted to a deceleration control device or a yaw movement control device of the tractor to stabilize a traveling of the combination vehicle.

2. The movement stabilizing apparatus according to claim 1, further comprising:
    a time constant setting unit which sets a phase of the output of the first-order lag processing unit so as to advance the phase of the yaw rate, based on an output of the cycle calculation unit.

3. The movement stabilizing apparatus according to claim 2, wherein
    a time constant and a gain which are used at a time of performing the first-order lag processing are determined based on a cycle or a period which is determined based on the pendulum movement of the trailer, and
    the time constant and the gain increase as a length of the cycle which is determined based on the pendulum movement of the trailer increases.

* * * * *